Dec. 9, 1958    H. A. LEDINGHAM ET AL    2,863,355
OPTICAL INSPECTION UNITS FOR BOTTLED GOODS
Filed March 29, 1955    4 Sheets-Sheet 1
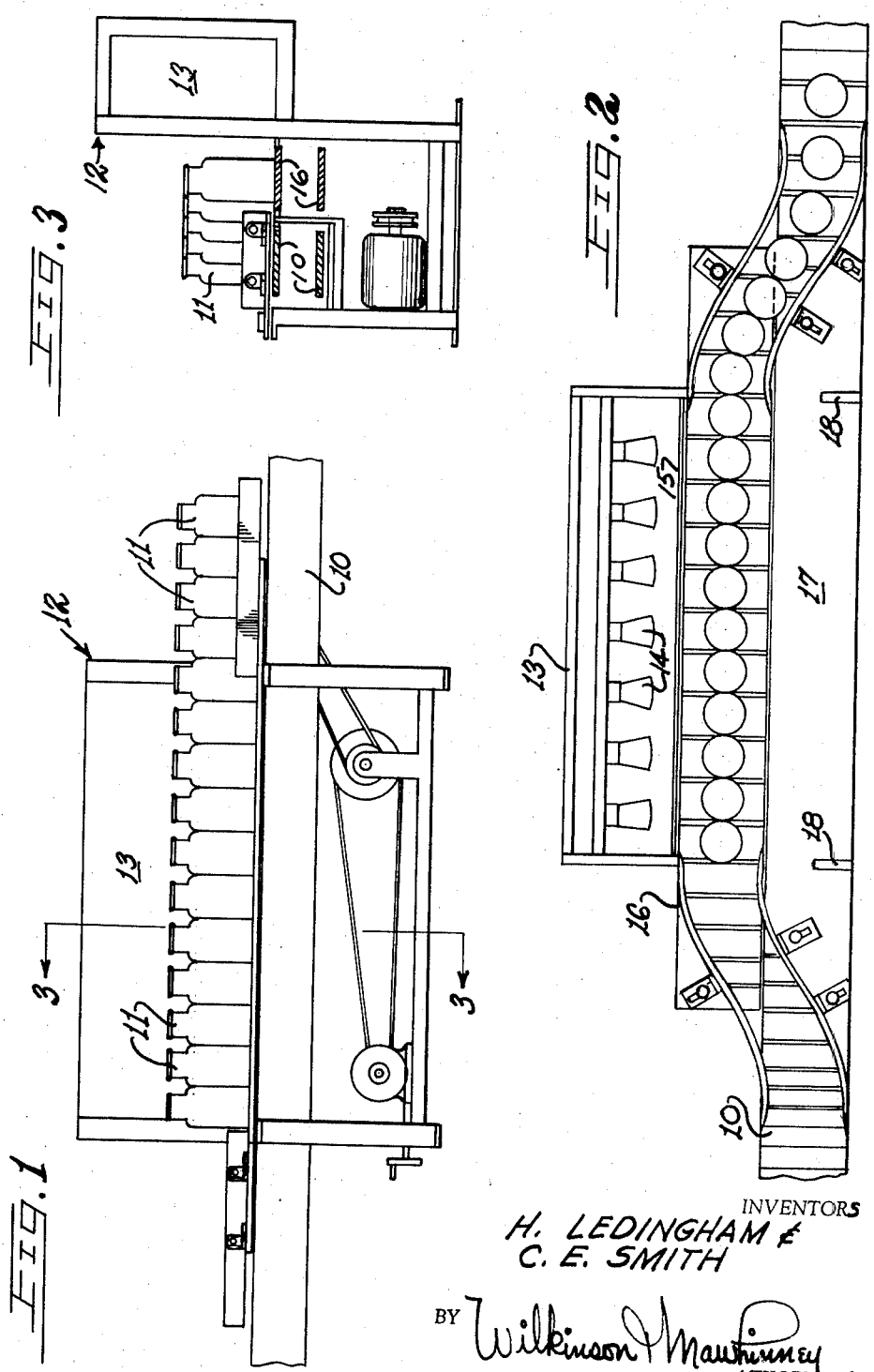
INVENTORS
H. LEDINGHAM &
C. E. SMITH
BY Wilkinson & Mawhinney
ATTORNEYS Dec. 9, 1958  H. A. LEDINGHAM ET AL  2,863,355
OPTICAL INSPECTION UNITS FOR BOTTLED GOODS
Filed March 29, 1955  4 Sheets-Sheet 2

INVENTORS
H. LEDINGHAM &
C. E. SMITH

BY Wilkinson Mawhinney
ATTORNEYS

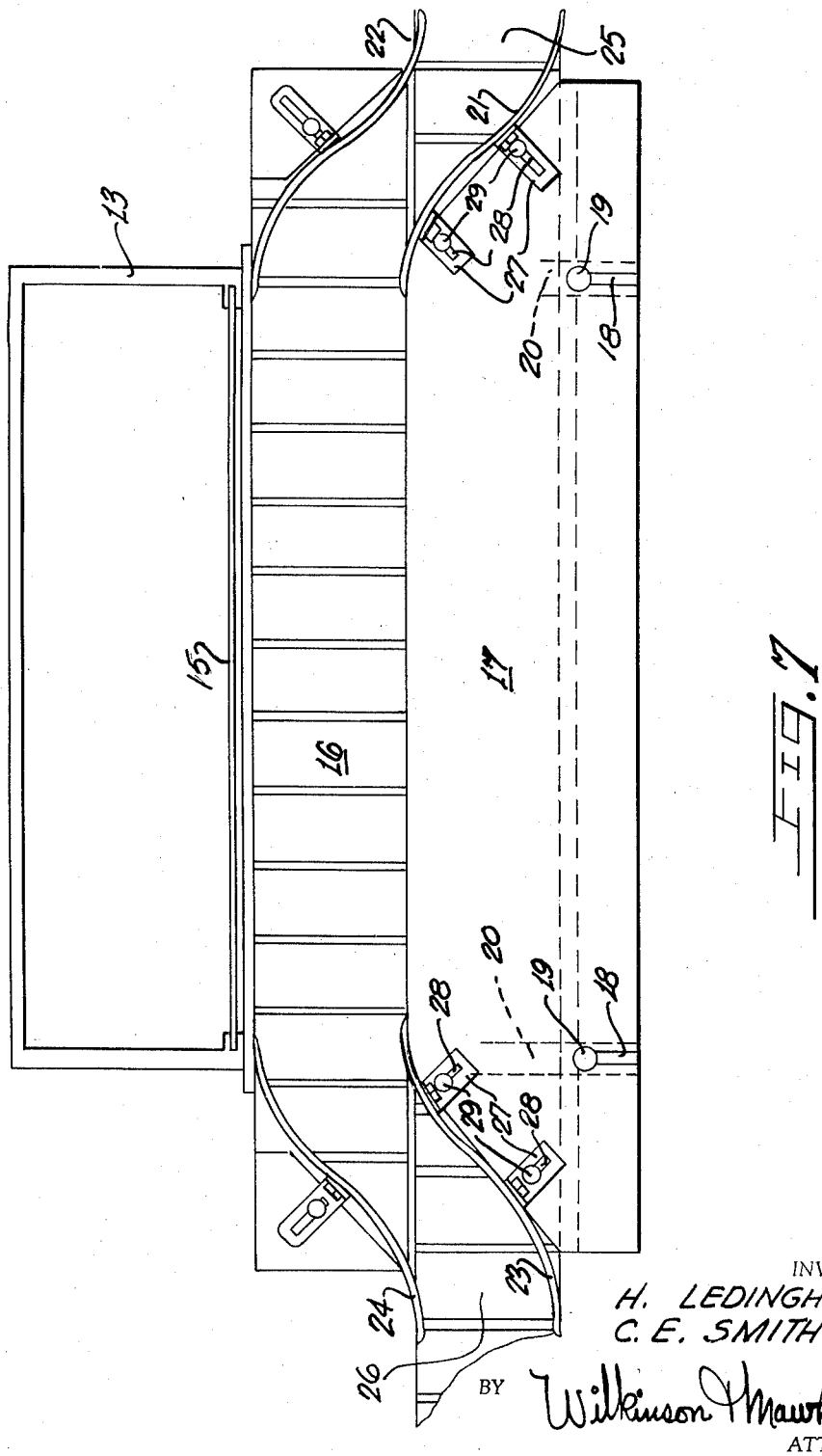

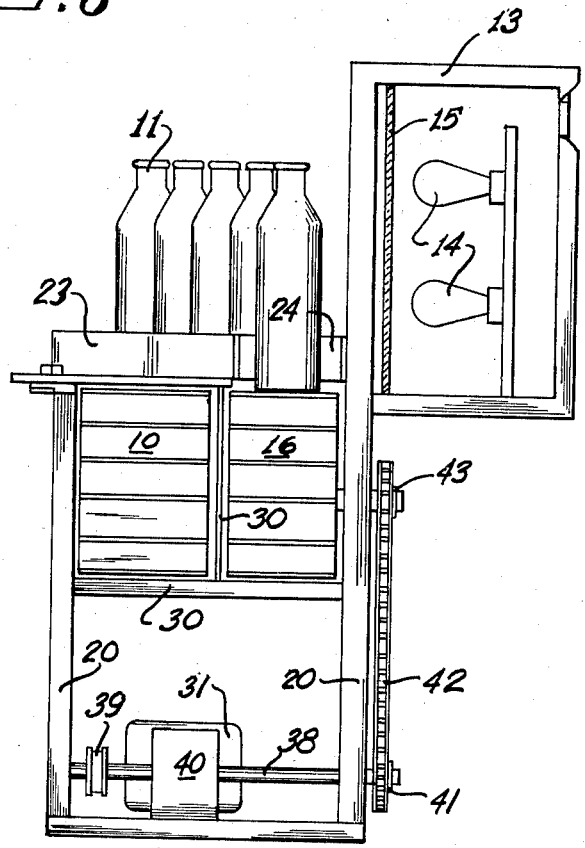

United States Patent Office 2,863,355
Patented Dec. 9, 1958

2,863,355

OPTICAL INSPECTION UNITS FOR BOTTLED GOODS

Harold A. Ledingham and Cornelius E. Smith, Godfrey, Ill.

Application March 29, 1955, Serial No. 497,568

2 Claims. (Cl. 88—14)

The present invention relates to inspection units for bottled goods and has for an object to provide an inspection unit which may be employed with presently existing bottling conveyors.

A further object of the present invention is to provide an inspection device which may be inserted in the bottling conveyor either between the capping station and cartoning station or en route to the washing station in order to permit inspection of the bottles to determine the presence of any foreign or non-desirable matter therein.

In the bottling industry bottlers have been subjected on numerous occasions to costly law suits due to foreign substances in the beverages bottled such as cigar butts, cockroaches and the like. This results in a costly premium of insurance for the bottlers and a need exists in this industry for a simple bottling inspection device which will increase not only the accuracy of inspection but the speed of inspection of the bottles to reduce the number of errors in inspection thereby resulting in a lower premium rate of insurance and reducing the bottlers civil liability.

A further object of the present invention is to provide a bottle inspection device in which a secondary conveyor is provided with deflecting means adapted to deflect bottles from the main conveyor onto a secondary conveyor and in which the secondary conveyor has a linear foot per minute speed less than that of the main conveyor thereby assuring that the bottles pass the inspection device in bottle to bottle contact. This bottle to bottle contact cuts down the light distortion between the source of light, the bottle to be inspected and the inspector. If a gap exists between the bottles the inspector is momentarily blinded to inspection for foreign substances in the beverage bottle.

A still further object of the present invention is to provide a bottle inspecting unit for use with conventional bottle conveyors which may be adjusted to receive bottles of differential diameters.

A still further object of the present invention is to provide a bottle inspection device having a secondary conveyor provided with means for independently driving the secondary conveyor at a slower speed differentially relative to the speed of the main bottling conveyor.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a front elevational view of an inspection unit for bottled goods constructed in accordance with the present invention shown associated with a main bottling conveyor.

Figure 2 is a top plan view of Figure 1.

Figure 3 is a transverse section taken on the line 3—3 in Figure 1.

Figure 7 is a top plan view of Figure 2 taken at a magnified scale to emphasize structural details of the bottle inspection unit.

Figure 8 is an end elevational view of a bottle inspection unit device constructed in accordance with the present invention having parts broken away and parts shown in section.

Figure 4:
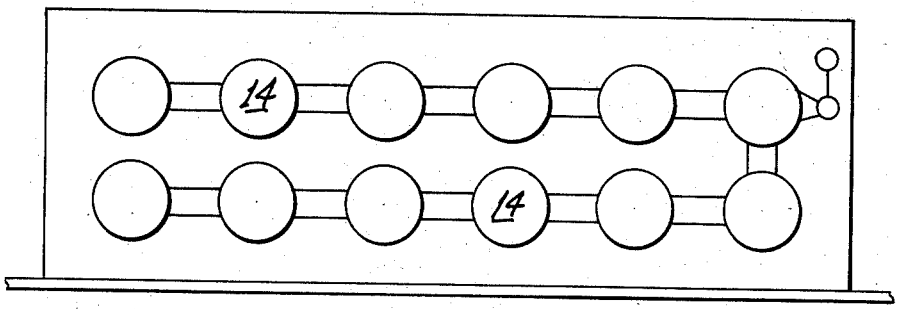
Figure 4 is a front elevational diagrammatic view of the lamp support in the light housing showing the wiring thereof.

Referring more particularly to the drawings, Figures 1 through 3, 10 designates a conventional bottling conveyor of the type known as a Whitney chain conveyor employed in bottling plants and well known to the bottling industry. The conveyor 10 conveys thereon bottles 11 either in a filled or unfilled state depending upon the use to which the conveyor 10 is put. The numeral 12 designates generally an inspection unit structure which consists of a light box 13 having lamps 14 therein and being provided with a frosted glass front 15 which is directed toward the main conveyor 10 as best seen in Figure 2. Intermediate the main conveyor 10 and the light box 13 is a secondary endless conveyor 16 which is carried by the inspection unit structure 12 as best seen in Figures 3 and 8. This conveyor 16 may be constructed on the Whitney principle in order to be similar to the main conveyor 10.

The front of the inspection unit structure 12 carries an inspection table 17 having slots 18 therein to permit inward adjustment of the table toward or away from the secondary conveyor 16. The table 17 overlies the portion of the main conveyor 10 in front of the light inspection box 13. The adjustment setting of the table toward or away from the light box is secured by bolts 19 carried by structural frame members 20 of the inspection unit structure 12.

Two pairs of bottle guide or deflecting units are provided one pair at the right hand end of the unit which consists of plates 21, 22 which are of a lazy S shape. And the other pair of similarly constructed bottle guide plates 23, 24 located on the structure 12 to the left hand end of the light box 13. The plates 21, 22 define an intake channel 25 and the plates 23, 24 define a discharge channel 26 for controlling the path of travel of bottles carried by the main and secondary conveyors. These bottle deflecting or guide plates are retained upon the table 17 and frame structure 12 by brackets 27 having slots 28 therein through which bolts 29 may be slid to anchor the brackets and plates at the desired position of relative opening therebetween.

The inspection unit structure 12 is provided with suitably spaced support braces 30 defining a cut-out for receiving and securing the main conveyor 10 to the inspection unit structure in order to maintain a rigidity throughout the entire construction for better stability.

Figure 5:
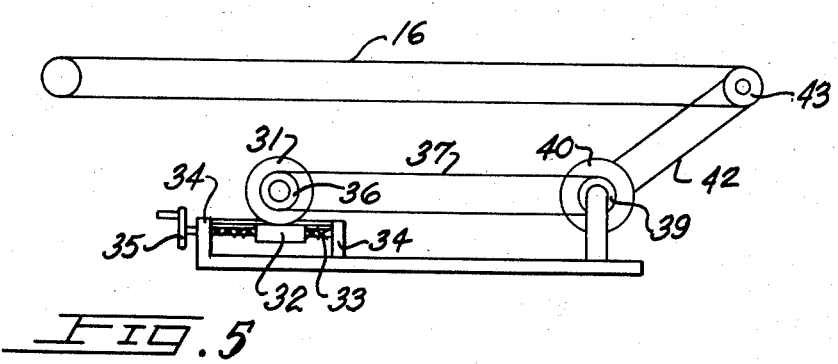
Figure 5 is a diagrammatic view of the drive means for the secondary conveyor associated with the bottling inspection unit.
Figure 6:
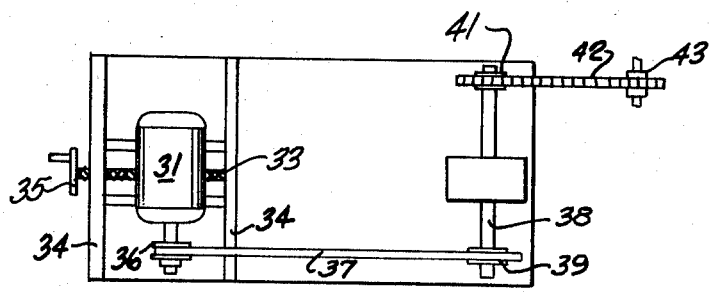
Figure 6 is a top plan view with parts broken away of Figure 5.

The inspection unit secondary conveyor 16 is provided with its own drive mechanism and prime mover which for example may consist of an electric motor 31 which may be of ¼ horsepower at 1725 R. P. M. which carries on its output shaft a pulley 36. The motor at its base is provided with a worm block 32 through which passes a threaded worm shaft 33 journaled in bearing supports 34. This worm shaft is rotated by a hand wheel 35 for rotating the worm shaft for moving the motor 31 along the axis of the worm shaft 33. The pulley 36 has a drive belt 37 roved thereover. This may for example be of the type of belt known commercially as a V-belt which is roved over a driven pulley 39 secured to a power shaft 38 and which drives the shaft 38. The shaft 38 passes through a reduction gearing case 40 where it undergoes a gear reduction for example at a 32 to 1 ratio. Coming out of the reduction gearing casing 40 the power shaft 38 drives a sprocket 41 over which is roved a drive chain 42 in driving mesh with a drive follower sprocket 43 for driving the secondary conveyor 16. This arrangement is best seen in Figures 5, 6 and 8.

In operation the inspection unit when being used to inspect full bottles is placed as close to discharge of the mixer as possible depending upon plant floor space. The motor 31 and lighting units 14 are connected to the plant electrical system and the speed of the secondary conveyor 16 is adjusted to a desired speed for the particular operation being conducted. Bottles 11 leaving the filling and capping station proceed along on the main conveyor 10 until they contact the intake channel 25 defined by plates 21, 22 of the inspection unit. These plates 21, 22 have previously been adjusted to vary the channel width to accommodate the bottles being inspected. This was accomplished by loosening the bolts 29 and sliding the brackets 27 to the desired position. Vernier adjustment may also be had by loosening the bolts 19 and sliding the table 17 toward or away from the secondary conveyor 16. The bottles are then deflected from the main conveyor 10 by the guide plates 21, 22 onto the secondary conveyor 16. The secondary conveyor 16 has a linear feet per minute speed less than the main bottling unit 10 in order that the bottles back up or stack in bottle to bottle contact and pass the light box 13 in front of the frosted glass 15 so that light from the lamps 14 passing through the glass 15 will then pass through the bottles 11. The bottles being in physical contact with one another and in a straight line will prohibit the escape of light around the sides of the bottle which might temporarily blind the inspector or at least temporarily impair his vision. By placing the inspection unit close to the filling and capping station the turbulence or convection current set up in the bottles will cause any sediment therein to still be in motion and readily discernible by the inspector who will then grasp the defective bottle and remove it from the conveyor 16 and place it on the table 17. As the bottles pass the light inspection box 13 they enter the discharge channel 26 defined by the deflecting plates 23, 24 which guide the bottles from the secondary conveyor 16 back onto the main conveyor 10 where they proceed along their way to the packaging station or to the washing station as the case may be.

The speed of the secondary conveyor is varied by the inspector by rotating the hand wheel 35 driving worm shaft 33 compelling the motor 31 to move towards or away from the power shaft 38 thereby increasing or decreasing the tension on the drive belt 37 which will have the effect of driving the belt 37 faster or slower depending upon the amount of slippage between the drive pulley 36 and belt 37.

In bottling units it is customary that small bottles be moved through the production line at a greater speed than larger bottles and we therefore employ what is known commercially in the industry as a Reves adjustable pulley attached to the motor which pulley can be adjusted by the simple operation of the hand wheel which will regulate the speed of the V-belt.

The inspection unit of the present invention permits the greatest possible number of bottles to be inspected at one and the same time and eliminates failures in detection of sediment and foreign matter. This is accomplished due to the fact that all of the bottles are in bottle to bottle contact and the usual space therebetween has been eliminated thus concentrating the light through instead of around the bottles which also prevents the blinding of the inspector.

The inspection device of the present invention is not restricted to soft drinks but may be employed for the inspection of beer, wine and liquor or in fact any liquid which has the desired degree of transparency to conduct the light and to permit of detection of sediment or foreign substances therein. Colored bottles whether white, green, brown or otherwise may be employed with the present invention.

The number of lamps and their wattage may vary due to the color or density of the bottles being inspected. Lamps of lower wattage and fewer lamps may be employed when inspecting clear glass bottles. Brown bottles would require a higher light level. The unit 12 may be of angle iron frame construction having a heavy galvanized sheet iron housing around the top rear and sides of the light box 13 which houses the bulbs varying in amounts and wattage.

One example of the particular drive ratios for the secondary conveyor is for example provision of a 1725 R. P. M. motor 31 driving the belt 37 which drives the shaft 38 having thereon the drive sprocket 41 which is an eleven toothed sprocket in mesh with the driving chain 42 which is roved about the sprocket 43 which is a seventeen toothed sprocket.

Although we have disclosed herein the best form of the invention known to us at this time, we reserve the right to all such modifications and changes as may come within the scope of the following claims.

What we claim is:

1. For use with a main bottle conveyor an inspection device for bottled goods comprising a support for supporting the conveyor, a light inspection station on said support spaced from the main conveyor, a secondary conveyor positioned on said support between the main conveyor and the light inspection station, an inspector's table carried by said support and positioned to overlie the portion of the main conveyor in front of said light inspection station, bottle deflecting means carried by said support to guide the bottles from the main conveyor on to said secondary conveyor past the light inspection station between said station and said table so that the light from the station will fall on the sides of the bottles opposite to the bottle sides exposed to the eyes of the inspector positioned at said table, and power means for driving the secondary conveyor at a speed less than the speed of the main conveyor for causing the bottles to pass the station in bottle to bottle contact to prevent the direct passage of light rays from said station to the eyes of the inspector.

2. An inspection unit for bottled goods as claimed in claim 1 wherein the bottle deflecting means is a pair of S-shaped plates mounted on said inspection table and support in parallelism to define a throat through which the bottles are guided between the main and secondary conveyors, and regulating means cooperating with said deflecting means, inspection table and support to vary the positioning of said deflecting plates to open or contract said throat to compensate for varying diameter bottles.

References Cited in the file of this patent

UNITED STATES PATENTS

| | | |
|---|---|---|
| 1,502,692 | Sterrett | July 29, 1924 |
| 1,885,892 | Bronander | Nov. 1, 1932 |
| 2,446,377 | Marshall | Aug. 3, 1948 |

FOREIGN PATENTS

| | | |
|---|---|---|
| 635,499 | Great Britain | Apr. 12, 1950 |